F. CONRAD.
ELECTRICAL SYSTEM.
APPLICATION FILED APR. 2, 1913.
1,235,012.
Patented July 31, 1917.
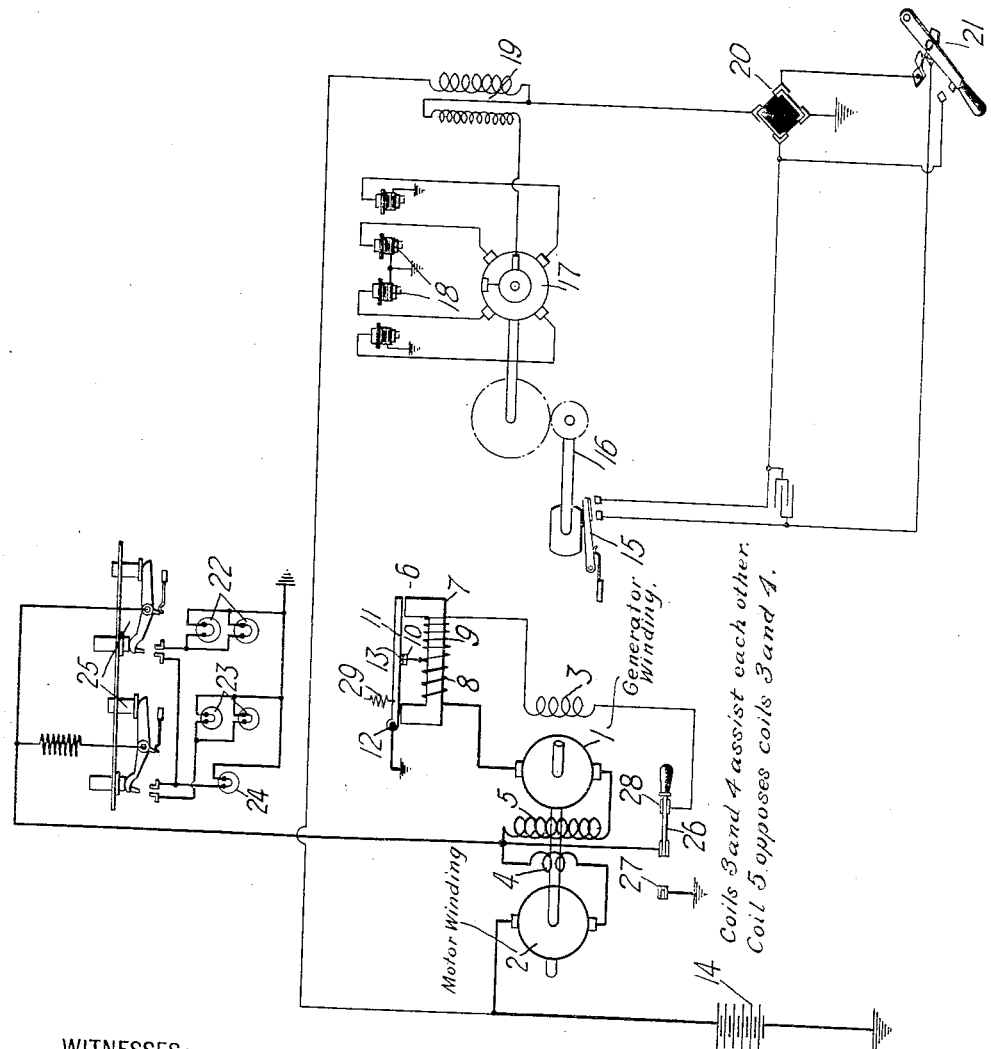

UNITED STATES PATENT OFFICE.

FRANK CONRAD, OF SWISSVALE, PENNSYLVANIA, ASSIGNOR TO WESTINGHOUSE ELECTRIC AND MANUFACTURING COMPANY, A CORPORATION OF PENNSYLVANIA.

ELECTRICAL SYSTEM.

1,235,012.   Specification of Letters Patent.   Patented July 31, 1917.

Application filed April 2, 1913. Serial No. 758,312.

*To all whom it may concern:*

Be it known that I, FRANK CONRAD, a citizen of the United States, and a resident of Swissvale, in the county of Allegheny and State of Pennsylvania, have invented a new and useful Improvement in Electrical Systems, of which the following is a specification.

My invention relates to electrical systems, and it has special reference to such systems as may be employed in the operation of gas engines of automobiles and other motor vehicles.

My invention has for its object to provide a simple construction for protecting the lamps of an automobile from an excessive voltage during the charging of a storage battery which supplies the lamps.

It is well known that the higher voltage is necessary in charging a storage battery than is furnished by the battery in discharging. For example, in a 12 volt battery, about 14 volts is required in charging. It is essential, therefore, in the use of lamps designed for the battery voltage, that some means be employed to protect the lamps while the battery is being charged.

I propose to provide a counter electromotive force in circuit with the battery and lamps when the battery is being charged. The counter electromotive force is small, being approximately of a value which represents the difference between the charging and discharging voltages of the battery.

The single figure of the drawing is a diagrammatic view of circuits and apparatus embodying my invention.

Referring to the drawings, a compound wound dynamo-electric machine is provided with a single armature having a generator armature winding 1 and a motor armature winding 2. These windings are connected to separate commutators and are electrically independent but may be wound in the same slots.

The field magnet windings, which are common to the armature windings, comprise a shunt winding 3, a series winding 4, which is wound to assist the shunt winding 3, and a differential series winding 5 which opposes the windings 3 and 4.

A cut out or automatic switch 6 comprises a core member 7, and two coils 8 and 9, respectively, in series and in shunt with the generator armature winding 1. The coils 8 and 9 are each connected to a contact member 10. An armature 11, which has a pivotal support at 12, is provided with a contact member 13 to engage the contact member 10 when the armature 11 is drawn downwardly.

One terminal of a storage battery 14 is connected to a terminal of the armature winding 2 and its other terminal is grounded. An ignition system, that is connected directly to the battery, comprises an interrupter 15 mounted on the shaft 16 of the dynamo electric machine, a distributer 17, spark plugs 18, an induction coil 19, a plug switch 20 and a starting switch 21.

A lighting system, that is connected to the field windings 4 and 5 at a common point, comprises headlights 22, side lights 23, and a tail light 24 of an automobile, and switches 25 to control the lamp circuits. The ignition and lighting systems form no part of the present invention and a complete description thereof is therefore omitted as unnecessary.

The connections of the generator armature winding 1 and the motor armature winding 2 are controlled by a single pole, double throw switch which comprises a movable member 26 and stationary contact members 27 and 28. It may be assumed that the dynamo electric machine is operatively connected to the engine (not shown) of an automobile. When the various parts are stationary, and it is desired to start the engine, the switch member 26 is thrown to the left or starting position to complete a circuit from the ungrounded side of the battery 14 through the motor armature winding 2, the series field winding 4, switch member 26, contact member 27 to ground and back to the battery. The dynamo electric machine then operates as a motor to start the engine. When the engine is operating under its own power, the operator throws the switch member 26 to the right or running position. A circuit is then completed from one brush of the generator armature through the series coil 8, shunt coil 9, shunt field winding 3, contact member 28, switch member 26 and differential field winding 5 to the other brush of the generator armature. As the generator speed increases, the voltage reaches a predetermined value at which the coils 8 and 9 are sufficiently energized to draw the armature 11 downwardly against the tension of a spring 29 to connect the contact members 10 and 13. The charging circuit, which is thus completed, extends from the ungrounded side of the battery through the motor armature winding 2, series field winding 4, differential field winding 5, generator armature winding 1, coil 8, contact members 10 and 13 and armature 11, to ground and back to the battery. The windings 1 and 2 then operate in series to charge the battery. The winding 1 generates approximately 12 volts and the winding 2, approximately 2 volts. The generator voltage is automatically regulated by the compound windings of the generator field magnet. It will be noted that, while the above circuit connections are maintained, the lighting system is subjected to the voltage of the generator winding 1 only. The battery receives the full charging voltage, but the motor winding 2 is in the circuit which includes the battery and the lamps, with its electromotive force opposing that of the battery.

When the generator voltage decreases to a value below that of the battery, the current will be reversed in the charging circuit, and the battery will tend to discharge back through the generator. The reversal of current through the series coil 8 causes its magnetic field to oppose that of the coil 9 and, as a result, the armature is released and is drawn upwardly by the spring 29. This action separates the contact members 10 and 13 to break the charging circuit. Current is now supplied to the ignition and lighting systems from the battery 14 at its discharge voltage.

It may be noted that the winding 2, which generates only two volts, is enabled to operate as a motor from the 12 volt battery because of the strengthening of the field by cutting out the differential field winding 5 and the drop in potential in the brushes caused by the heavy current used in starting the engine. The motor winding is in series with the lamps when the battery supplies lighting current, but the low resistance of the motor brushes and winding renders the loss very slight. Since the armature winding 2 is designed to generate a low voltage, and only a small current flows through the circuit comprising the lamps and the motor windings, the torque is insufficient to rotate the armature when the battery supplies current to the lighting circuit.

It will be understood that, while I have employed a dynamo-electric machine as a source of counter electro-motive force to protect the lamps, I may use any other device which will perform the same functions. In the preferred form of my invention, I employ a dynamo-electric machine with a single armature, but I may, if it is so desired, use separate machines in the same relations as here illustrated and described.

I claim as my invention:

1. The combination with a dynamo-electric machine having two independent armature windings, a storage battery and a current-consuming device, of means for controlling the circuits of said devices whereby a single armature winding is connected in circuit with said battery and said device for operation as a motor, and both of said windings are connected in series relation to each other, one of said windings being interposed between said battery and said device, for operation as a generator.

2. The combination with a dynamo-electric machine having two independent armature windings, a storage battery and a current-consuming device, of means for controlling the circuits of said devices whereby a single armature winding is connected in circuit with said battery and said device for operation as a motor, and both of said windings are connected in series relation to each other, one of said windings being arranged in parallel relation to said device, for operation as a generator.

3. The combination with a generator winding, a motor winding, a battery, a lamp, and electrical connections between said several devices, of means for controlling said connections whereby said motor winding may receive current from said battery and whereby, when said battery receives energy from said windings, said motor winding is connected in series with said lamp with its electromotive force opposed to that of said battery.

4. The combination with a dynamo-electric machine having two independent armature windings, of a storage battery, a current-consuming device, and means for connecting said armature windings and said battery in series relation and for connecting one of said windings permanently in circuit with said current-consuming device, with the electromotive force generated by said winding opposed to that of said battery.

5. The combination with a dynamo-electric machine having two separate armature windings, of a storage battery permanently in circuit with one of said windings and means for connecting the other of said windings in circuit with said battery at a predetermined voltage.

6. The combination with a dynamo-electric machine having two independent armature windings, a storage battery and a current-consuming device, of means for connecting one of said windings permanently in circuit with said battery and means for connecting the other of said windings in circuit with said battery at a predetermined voltage.

In testimony whereof, I have hereunto subscribed my name this 29th day of March 1913.

FRANK CONRAD.

Witnesses:
R. E. CULLINGS,
B. B. HINES.